United States Patent
Tidestav

(10) Patent No.: US 9,008,042 B2
(45) Date of Patent: Apr. 14, 2015

(54) CONTROLLING UPLINK TRANSMIT POWER RESPONSIVE TO COMBINATION OF RECEIVED POWER CONTROL COMMANDS DURING SOFT HANDOVER IN A COMMUNICATION SYSTEM

(75) Inventor: Claes Tidestav, Bålsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 169 days.

(21) Appl. No.: 13/581,681

(22) PCT Filed: Jul. 2, 2012

(86) PCT No.: PCT/SE2012/050761
§ 371 (c)(1),
(2), (4) Date: Aug. 29, 2012

(87) PCT Pub. No.: WO2013/051987
PCT Pub. Date: Apr. 11, 2013

(65) Prior Publication Data
US 2014/0003388 A1 Jan. 2, 2014

Related U.S. Application Data

(60) Provisional application No. 61/543,205, filed on Oct. 4, 2011.

(51) Int. Cl.
H04W 52/04 (2009.01)
H04W 52/28 (2009.01)
H04W 52/40 (2009.01)
H04W 52/14 (2009.01)
H04W 52/16 (2009.01)
H04W 52/24 (2009.01)
H04W 52/32 (2009.01)

(52) U.S. Cl.
CPC ............ *H04W 52/40* (2013.01); *H04W 52/146* (2013.01); *H04W 52/16* (2013.01); *H04W 52/244* (2013.01); *H04W 52/286* (2013.01); *H04W 52/325* (2013.01)

(58) Field of Classification Search
None
See application file for complete search history.

(56) References Cited

U.S. PATENT DOCUMENTS 6,334,047 B1 * 12/2001 Andersson et al. ............. 455/69
2008/0200202 A1 * 8/2008 Montojo et al. ............... 455/522
(Continued)

FOREIGN PATENT DOCUMENTS

EP 1 494 366 A1 1/2005
GB 2 452 288 A 3/2009
(Continued)

OTHER PUBLICATIONS

S. Landstrom, et al.; "Heterogeneous networks-increasing cellular capacity", Ericsson Review 2011, 6 pages.
(Continued)

*Primary Examiner* — Hassan Phillips
*Assistant Examiner* — Ayanah George
(74) *Attorney, Agent, or Firm* — Myers Bigel Sibley & Sajovec, P.A.

(57) ABSTRACT

A method by a user equipment node controls uplink transmission power during soft handover of the user equipment node from a first base station to a second base station. A transmission power control command is received by the user equipment node from each of the first and second base stations during the soft handover. Uplink transmission power by the user equipment node of a high-speed dedicated physical control channel is controlled responsive to the received transmission power control commands.

24 Claims, 7 Drawing Sheets

(56) References Cited

U.S. PATENT DOCUMENTS

2012/0008510 A1* 1/2012 Cai et al. .................. 370/252
2012/0157152 A1* 6/2012 Blomgren et al. ............ 455/522

FOREIGN PATENT DOCUMENTS

| WO | WO 2005/125040 A2 | 12/2005 |
| WO | WO 2005125040 A2 * | 12/2005 |
| WO | WO 2006/071162 A1 | 7/2006 |
| WO | WO 2009/072945 A1 | 6/2009 |

OTHER PUBLICATIONS

A. Toskala, et al.; "High-speed Downlink Packet Access", WCDMA for UMTS, 2002, pp. 289-290, Chapter 11.5.3, John Wiley & Sons, Ltd.

$3^{rd}$ Generation Partnership Project; "Technical Specification Group Radio Access Network"; Physical Layer; Measurements (FDD), (Release 10) pp. 1-23, 3GPP TS 25.215 V10.0.0 (Mar. 2011) France.
$3^{rd}$ Generation Partnership Project; "Technical Specification Group Radio Access Network"; Spreading and modulation (FDD), (Release 10) pp. 1-39, 3GPP TS 25.213 V10.0.0 (Sep. 2010) France.
$3^{rd}$ Generation Partnership Project; "Technical Specification Group Radio Access Network"; Physical Layer Procedures (FDD), (Release 10) pp. 1-99, 3GPP TS 25.214 V10.0.0 (Sep. 2010) France.
International Search Report and Written Opinion of the International Searching Authority, PCT Application No. PCT/SE2012/050761, Oct. 18, 2012.
Motorola: "HS-DPCCH Power Control in Soft-Handoff" TSG-RAN1#26; TSGR1-02-0719. $3^{rd}$ Generation Partnership Project (3GPP); Technical Specification Group (TSG) Radio Access Network (RAN); Workinggroup 1 (WG1), May 13-16, 2002; GyeongJu, Korea.

* cited by examiner

CONTROLLING UPLINK TRANSMIT POWER RESPONSIVE TO COMBINATION OF RECEIVED POWER CONTROL COMMANDS DURING SOFT HANDOVER IN A COMMUNICATION SYSTEM

CROSS-REFERENCE TO RELATED APPLICATION

This application is a 35 U.S.C. §371 national stage application of PCT International Application No. PCT/SE2012/050761, filed on 2 Jul. 2012, which claims priority to U.S. Provisional Application No. 61/543,205, filed on Oct. 4, 2011. The disclosures of the applications are hereby incorporated herein in their entireties by reference.

TECHNICAL FIELD

The present invention relates to wireless communication systems and, more particularly, systems and methods that control uplink transmit power from user equipment nodes to network nodes.

BACKGROUND

Wideband Code Division Multiple Access (WCDMA) is a mobile radio access network standard specified by a 3rd Generation Partnership Project (3GPP) and used in third generation wireless data/tele-communication systems.

Soft handover is an important feature in all WCDMA systems. With soft handover, User Equipment Nodes (UEs) are effectively connected to several base stations at the same time. This improves reliability, since a UE that moves from one cell to another establishes a link to the new cell, before the link to the old cell is torn down. The way that soft handover is combined with transmit power control also limits uplink (UL) interference in soft handover scenarios.

An example WCDMA system 100 is shown in FIG. 1. The system 100 includes a UE 110 that communicates with two base stations (also referred to as "Node Bs" and "network nodes" herein) 120a and 120b through a radio air interface. The base stations 120a-b are controlled by a radio network controller (RNC) 130 and connected to a core network 140.

Because WCDMA and High Speed Packet Access (HSPA) use common frequencies in all cells, a UE located at a border of one cell will cause uplink interference to neighboring cell(s). This interference can be particularly problematic because the UE located at the cell border (cell edge) will typically be transmitting near an upper range of its UL transmit power.

Soft handover can be used to reduce uplink interference to the neighboring cell(s). UEs at the border between two cells are connected to both (several in the general case) cells. The UEs therefore transmit data to both cells and receive data from both cells.

Transmit power control (or simply power control) is another important operation in WCDMA UL, since the channels within one cell are non-orthogonal; a transmission from one UE can strongly interfere with a transmission from another UE. In a WCDMA system, the uplink and downlink communications are power controlled. The UE signals to a base station how it shall regulate its downlink transmission power. In a similar way the base station signals to the UE how it shall regulate its uplink transmission power. A new transmit power control (TPC) command can be signaled every slot (e.g., 1500 TPC commands per second). Accordingly, at 1500 times per second, each UE can be commanded to either increase or decrease its transmit power by a predetermined step.

The base station can control the UL packet error rate performance and UL interference by controlling the transmission power of the UE. As the UE increases its transmission power the experienced signal to interference ratio at the base station will in general increase. An increased signal to interference ratio will result in a lower packet error rate. In this way the base station can tune the uplink packet error rate.

In soft handover, a UE is receiving power control commands from more than one cell. Based on the received signal, each cell commands the UE to either increase or decrease its transmit power. The UE thus receives several, possibly conflicting, transmit power commands. The power control commands from the cells are combined to decide if the UE should either increase or decrease its transmit power. To combine the power control commands, the UE follows an operational rule that if any power control commands contain a DOWN request, the UE reduces its transmit power.

A UE transmits data and control information on physical channels that can include Dedicated Physical Control CHannel (DPCCH), Enhanced-DPCCH (E-DPCCH), Enhanced Dedicated Physical Data CHannel (E-DPDCH), and High-Speed DPCCH (HS-DPCCH). The DPCCH transmits pilot bits that are known by the base station and also Layer 1 control information. The pilot bits are used as a reference by the base station to estimate the radio channel conditions (e.g. searcher, channel estimation, frequency offset estimation, and signal to interference ratio). The E-DPCCH transmits control information related to the enhanced dedicated physical data channel. The E-DPDCH transmits the data bits.

FIG. 2 illustrates graphs of transmission power levels and associated Transmission Power Control (TPC) commands that may be transmitted from a base station to a UE and, vice versa, from the UE to the base station to control the transmission power levels in the downlink and uplink directions. The base station measures the UL signal-to-interference ratio (SIR) on the DPCCH and compares it with a target value of the SIR. When the measured SIR is above the target SIR, the base station signals to the UE to decrease its transmission power. When the measured SIR is below the target SIR, the base station signals to the UE to increase its transmission power. For UEs capable of transmitting enhanced uplink, the UL-TPC (Up Link Transmission Power Control) commands are signaled to the UE on the downlink (DL) channel F-DPCH (Fractional Dedicated Physical CHannel).

In a similar manner the UE measures the quality of the F-DPCH that it receives from the base station. When the quality is sufficient, the UE signals to the base station that it can decrease the transmission power on the F-DPCH. When the quality is not sufficient, the UE signals to the base station to increase the transmission power on the F-DPCH. The DL-TPC commands are sent to the base station on the uplink channel DPCCH. The transmission power level of the E-DPCCH and the E-DPDCH may be controlled in response to a power offset relative to the transmission power level of the DPCCH.

The TPC commands control the UE transmit power for DPCCH ($P_{DPDCH}$). The UE controls the transmit power levels for the E-DPCCH ($P_{E\text{-}DPCCH}$), the E-DPDCH ($P_{E\text{-}DPDCH}$), and the HS-DPCCH ($P_{HS\text{-}DPCCH}$) in response to a predefined power offset relative to the transmission power level of the DPCCH ($P_{DPDCH}$), as follows:

$$P_{DPDCH} = \beta_D P_{DPCCH}$$

$$P_{E\text{-}DPCCH} = \beta_{EC} P_{DPCCH}$$

$P_{E\text{-}DPDCH} = \beta_{ED} P_{DPCCH}$ $P_{HS\text{-}DPCCH} = \beta_{HS} P_{DPCCH}$ where all the β parameter values are independent of (not controlled in response to) the TPC commands. The β parameter values are computed based on quantized amplitude ratios, which are translated from $\Delta_{ACK}$, $\Delta_{NACK}$, and $\Delta_{CQI}$ signaling. Computation of β parameter values is explained in 3GPP TS 25.213 V10.0.0 (2010-09), Sect. 4.3.1.2, and translation of $\Delta_{ACK}$, $\Delta_{NACK}$, and $\Delta_{CQI}$ signaling into β parameter values is explained in 3GPP TS 25.214 V10.0.0 (2010-09), Sect. 5.1.2.5A.

FIG. 3 illustrates a UE 110 that is connected to two base stations 120a and 120b in a heterogeneous network. One of the base stations 120b is a low power node (e.g., pico node) having significantly lower transmission power than the other base station 120a (e.g., macro node). Cell selection is typically based on downlink received power, with the illustrated UE 110 typically connected to the base station 120a or 120b from which it receives the highest transmit power, including effects of the different base station transmission powers.

This leads to a cell area surrounding the low power base station 120b where the high power base station 120a is selected, but where the path loss is lower toward the lower power base station 120b. In the uplink direction, where the transmit power is the same, it would be better for the UE 110 to be connected to the low power base station 120b.

If several base stations are received with similar transmit powers, the UE 110 enters soft handover. The above described operational rule for combining power control commands received from different base stations is intended to ensure that data reaches one of the cells involved in a soft handover. For the DPDCH, E-DPCCH and E-DPDCH, it is indeed enough that the transmission reaches one of the cells. However, the HS-DPCCH must reach one specific cell out of the cells involved in the soft handover, the so-called serving HS cell. The serving HS cell is the cell from which the high-speed downlink shared channel (HS-DSCH) is transmitted. The HS-DPCCH carried channel quality reports (CQIs) and ACK/NACKs that must reach the serving HS cell within a short delay (in the order of a few milliseconds).

With the current TPC command combining rule, the DPCCH transmit power may be reduced so that the HS-DPCCH is only received in the non-serving cell. To help alleviate the problem, the parameter $\beta_{HS}$ may be increased by a certain amount when the UE 110 enters soft handover. However, such an increase may be unnecessary in some cases, resulting in too high of an interference level (an unnecessary interference level).

However, more importantly, in the context of the heterogeneous network of FIG. 3, where the UE 110 communicates with the low power base station 120b and the high power base station 120a, and the UE 110 is connected to the base station with the strongest received signal, the cell-border can be quite close to the low power base station 120b. In this case, the low power base station 120b will receive a correspondingly very strong signal from the UE 110, and it will subsequently order the UE 110 to reduce it transmit power quite significantly. As a result, the signal received at the high power base station 120a (which may still be serving HE cell), will be quite weak, and using a fixed, large offset $\beta_{HS}$ will be insufficient for the high power base station 120a to properly receive the signal from the UE 110.

Another situation where this problem is made worse is when Coordinated Multi-Point (CoMP) is deployed. When operating with CoMP, the base stations (e.g., 120a and 120b) involved in the soft handover will transmit different signals over the HS-DSCH, and the individual HS-DPCCH transmissions must reach both base stations (e.g., 120a and 120b).

The approaches and presently recognized problems described above in this section could be pursued, but are not necessarily approaches and/or problems that have been previously conceived or pursued. Therefore, unless otherwise clearly indicated herein, the approaches and problems described above in this section are not prior art to claims in any application claiming priority from this application and are not admitted to be prior art by inclusion in this section.

SUMMARY

It may therefore be an object to address at least some of the above mentioned disadvantages and/or to improve performance in a wireless communication system. Some embodiments of the present invention, for example, may provide improved power control during soft handover of a user equipment node (UE) between base stations.

Some embodiments are directed to a method by a UE for controlling uplink transmission power during soft handover of the UE from a first base station to a second base station. A transmission power control (TPC) command is received from each of the first and second base stations during the soft handover. The UE controls uplink transmission power of a high-speed dedicated physical control channel responsive to the received TPC commands.

In some situations, the UE can receive conflicting TPC commands from the base stations. However, by combine the TPC commands from the base stations, the uplink transmission power of the high-speed dedicated physical control channel can be more robustly controlled so it can be received by whichever of the base stations is operating as a high-speed serving cell for the UE while avoiding unnecessary interference to the other base station.

In a further embodiment, the UE determines a parameter ($\beta_{HS}$) responsive to a combination of the received TPC commands, and controls the uplink transmission power of the high speed dedicated physical control channel responsive to a result of multiplying the parameter ($\beta_{HS}$) and a transmission power level by the UE of a dedicated physical control channel.

In a further embodiment, the UE determines the parameter ($\beta_{HS}$) by determining a maximum value ($\beta_{HS}^{max}$) of the parameter ($\beta_{HS}$), and determining when a condition occurs that at least one of the TPC commands received from the first and second base stations contains a request for the UE to decrease transmission power of the dedicated physical control channel and the parameter ($\beta_{HS}$) is less than the maximum value ($\beta_{HS}^{max}$). The UE responds to the determination that the condition occurred by reducing the uplink transmission power by the UE of the dedicated physical control channel. Accordingly, when conflicting TPC commands are received from the base stations, the UE will choose to decrease the uplink transmission power when the recited condition occurs while avoiding unnecessary interference to the other base station.

In a further embodiment, the first base station is a serving high-speed cell for the UE for communication of signals to the UE on a high-speed downlink shared channel. The UE determines when a condition occurs that the TPC command received from the first base station contains a request for the UE to decrease transmission power of the dedicated physical control channel. The UE responds to the determination that the condition occurred by reducing the uplink transmission power by the UE of the dedicated physical control channel. Accordingly, when conflicting TPC commands are received from the base stations, the UE will choose to decrease the uplink transmission power when the serving HS first base station requests the UE to decrease transmission power.

In a further embodiment, the first base station is a serving high-speed cell for the UE for communication of signals to the UE on a high-speed downlink shared channel. The UE determines when a condition occurs that the TPC command received from the first base station contains a request for the UE to decrease transmission power of the dedicated physical control channel. The UE responds to the determination that the condition occurred by reducing the uplink transmission power by the UE of the dedicated physical control channel.

In a further embodiment, the first base station is a serving high-speed cell for the UE for communication of signals to the UE on a high-speed downlink shared channel. The UE determines the parameter ($\beta_{HS}$) by determining when a condition occurs that the UE reduced the uplink transmission power of the dedicated physical control channel and the TPC command received from the first base station contains a request for the UE to increase transmission power of the dedicated physical control channel. The UE responds to the determination that the condition occurred by increasing the parameter ($\beta_{HS}$) to increase the uplink transmission power by the UE of the high-speed dedicated physical control channel.

In a further embodiment, the first base station is a serving high-speed cell for the UE for communication of signals to the UE on a high-speed downlink shared channel. The UE determines the parameter ($\beta_{HS}$) by determining when a condition occurs that the TPC command received from the first base station contains a request for the UE to decrease transmission power of the dedicated physical control channel. The UE responds to the determination that the condition occurred by resetting the parameter ($\beta_{HS}$) to a predefined nominal value responsive to the determination that the condition occurred.

In further embodiments, the UE may increase the parameter ($\beta_{HS}$) by a fixed step size responsive to the TPC commands containing a request for the UE to increase transmission power of the high-speed dedicated physical control channel. The UE may alternatively access a table that defines values of the parameter ($\beta_{HS}$) and corresponding step-sizes, using a present value of the parameter ($\beta_{HS}$) as an index to look-up one of the step-sizes, and add the looked-up one of the step-sizes to the present value of the parameter ($\beta_{HS}$) to generate a new value for the parameter ($\beta_{HS}$) used to control the uplink transmission power of the high-speed dedicated physical control channel.

Other embodiments are directed to a corresponding UE that includes a transceiver and a controller circuit. The transceiver receives a TPC command from each of a first base station and a second base station during soft handover of the UE from the first base station to the second base station. The controller circuit controls uplink transmission power by the transceiver of a high-speed dedicated physical control channel responsive to the received TPC commands.

Other methods, user equipment nodes, and systems according to embodiments of the invention will be or become apparent to one with skill in the art upon review of the following drawings and detailed description. It is intended that all such additional methods, user equipment nodes, and systems be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The following example embodiments provide a number of advantages and benefits relative to existing uplink transmission power control provided by UEs and base stations. It will be appreciated by those skilled in the art in view of the present description, however, that the invention is not limited to these embodiments which produce any or all of these advantages or benefits and that other advantages and benefits may be realized depending upon the particular implementation.

Various embodiments of the present invention are directed to controlling uplink transmission power between base stations (e.g., a Node B) and a UE during soft handover. Although embodiments are disclosed in the context of a WCDMA 3GPP third generation communication system for ease of illustration and explanation only, the invention is not limited thereto. Instead embodiments of the invention may also be embodied in other types of base stations, UEs, and communication systems that control uplink transmission power. Moreover, although only a pair of base stations are shown in FIG. 1, it is to be understood that the UE may communicate with any number of base stations during soft handover as controlled by predefined soft handover operations and methods.

Figure 1:
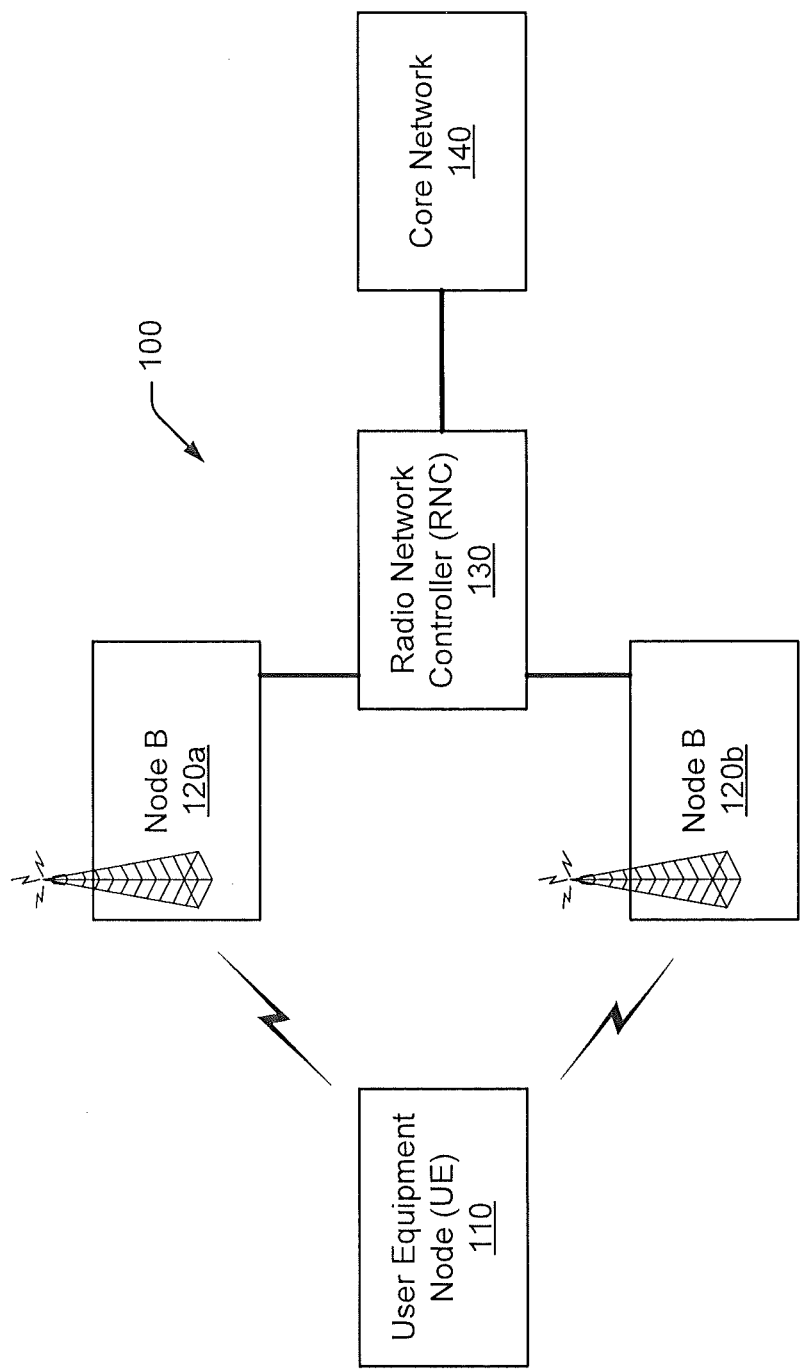
FIG. 1 is a block diagram of a communications system that regulates uplink and downlink transmission power between base stations and UEs.
Figure 2:
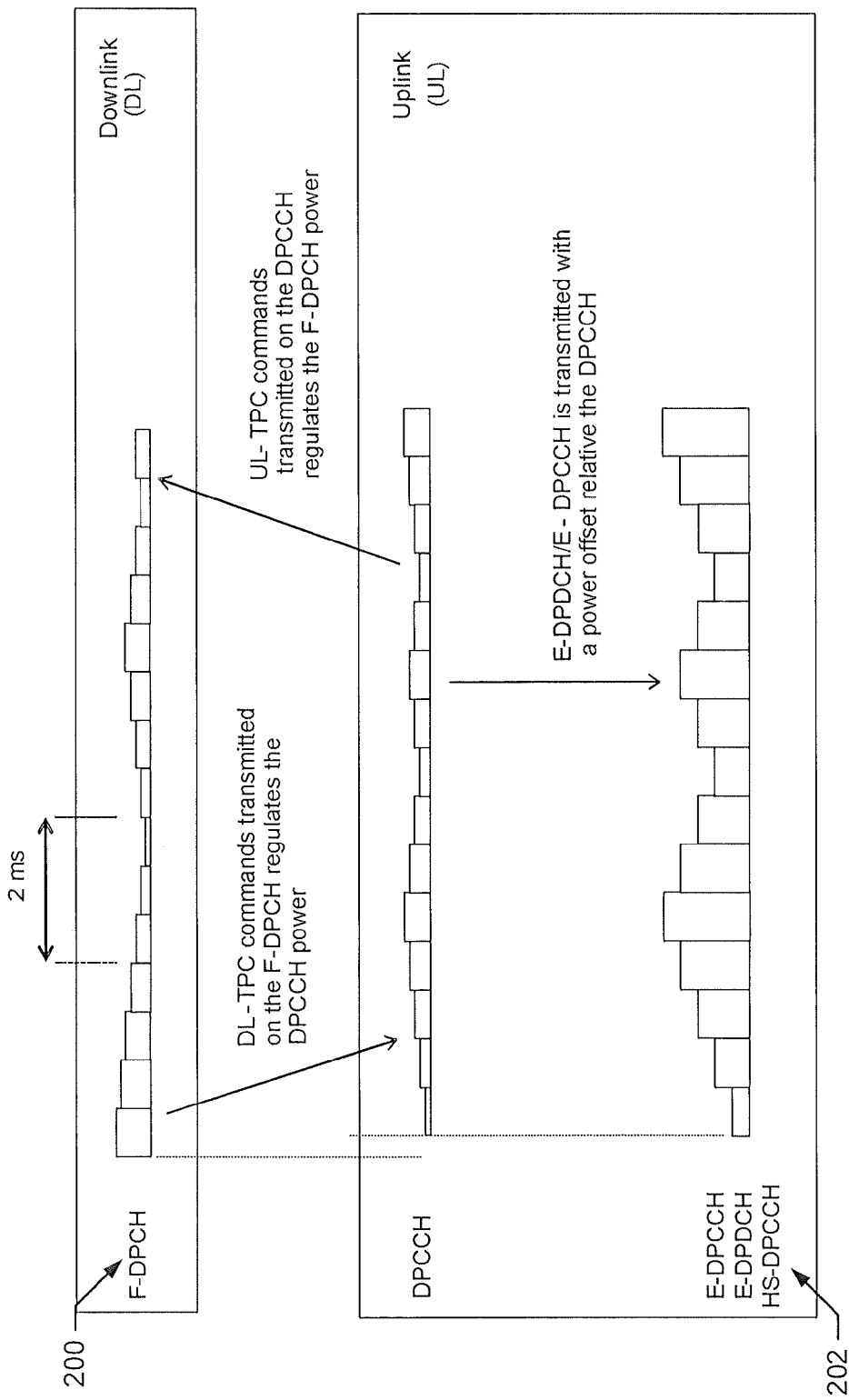
FIG. 2 illustrates graphs of transmission power levels and associated TPC commands that may be transmitted from the base stations to the UE of FIG. 1 through dedicated physical channels and vice versa to control the transmission power levels in the downlink and uplink directions.
Figure 3:
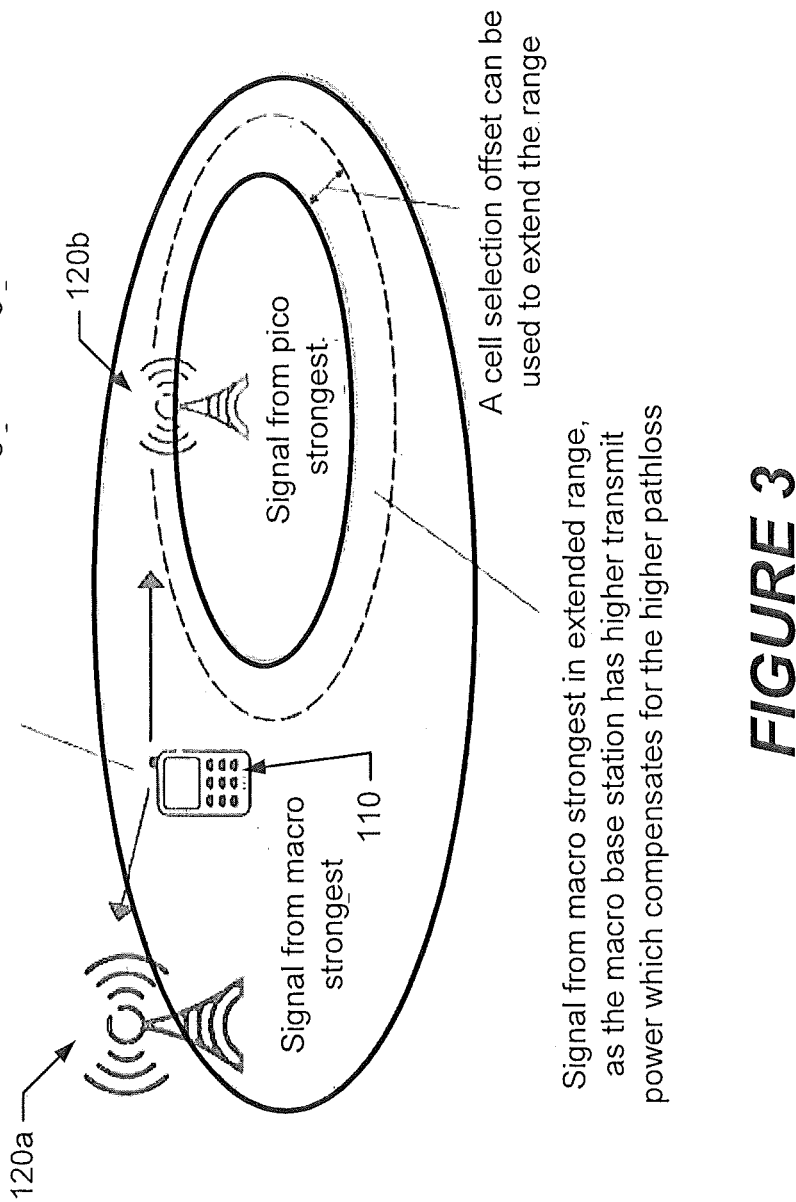
FIG. 3 is a block diagram of a UE connected to two base stations in a heterogeneous network.

With further reference to FIG. 1, the UE 110 may be a mobile telephone ("cellular" telephone), a data terminal, and/or another processing device with wireless communication capability, such as, without limitation, a portable computer, a pocket computer, a hand-held computer, a laptop computer, an electronic book reader, and/or a video game console. During soft handover, the UE 110 communicates with the base stations (e.g., Node Bs) 120a and 120b, and dynamically controls its uplink transmission power in response to TPC commands received from the base stations 120a,120b over physical channels.

Each base station 120a and 120b measures the UL signal-to-interference ratio (SIR) on the DPCCH (Dedicated Physical Control CHannel) from the UE 110 and compares it with a target value of the SIR. When the measured SIR is above the target SIR, the base station sends a TPC command containing a DOWN request (instruction) to the UE 110 to request that the UE 110 decrease its uplink transmission power. When the measured SIR is below the target SIR, the base station sends a TPC command containing an UP request to the UE 110 to request that the UE 110 increase its uplink transmission power. When the UE 110 is capable of transmitting enhanced uplink, the UL-TPC commands are signaled to the UE 110 on the downlink channel F-DPCH (Fractional Dedicated Physical CHannel).

The TPC commands control the UE transmit power for DPCCH ($P_{DPDCH}$). The UE 110 controls the transmit power levels for the E-DPCCH ($P_{E\text{-}DPCCH}$), the E-DPDCH ($P_{E\text{-}DPDCH}$), and the HS-DPCCH ($P_{HS\text{-}DPCCH}$) in response to a power offset relative to the transmission power level of the DPCCH ($P_{DPDCH}$), as follows:

$$P_{DPDCH} = \beta_D P_{DPCCH}$$

$$P_{E\text{-}DPCCH} = \beta_{EC} P_{DPCCH}$$

$$P_{E\text{-}DPDCH} = \beta_{ED} P_{DPCCH}$$

$$P_{HS\text{-}DPCCH} = \beta_{HS} P_{DPCCH}$$

where the $\beta_D$, $\beta_{EC}$, $\beta_{ED}$ parameter values are independent of the TPC commands, in accordance with some embodiments. In accordance with some other embodiments, one or more of the $\beta_D$, $\beta_{EC}$, $\beta_{ED}$ parameter values may be controlled in a similar manner to that described below for parameter value $\beta_{HS}$.

Based on the received signal, each base station 120a,120b commands the UE 110 to either increase or decrease its uplink transmission power. The UE 110 therefore concurrently receives several, possibly conflicting, transmit power commands. The transmit power commands from the base stations 120a,120b are combined to decide if the UE 110 should either increase or decrease it uplink transmission power.

In accordance with various embodiments of the present invention, the UE 110 is configured to combine the TPC commands from the base stations 120a,120b using operations and methods that more robustly ensure that the HS-DPCCH reaches the intended one of the base stations 120a,120b (the serving high-speed (HS) cell).

Figure 4:
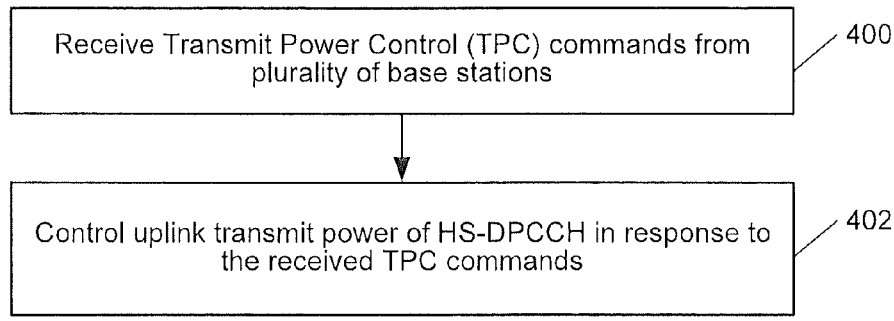
FIGS. 4-8 are flowcharts that illustrates operations and methods for controlling uplink transmission power in accordance with some embodiments of the present invention.

FIG. 4 is a flowchart that illustrates operations and methods for controlling transmission power level of HS-DPCCH in accordance with some embodiments of the present invention. The UE 110 concurrently receives (block 400) TPC commands from the base stations 120a,120b. The concurrently received TPC commands are not necessarily simultaneously received or received during overlapping times, but may additionally or alternatively refer to a scenario when one of the TPC commands is received while the other TPC command is being considered by the UE 110 for use in controlling transmission power. The UE 110 controls (block 402) uplink transmit power of the HS-DPCCH in response to the received TPC commands.

The TPC commands may be received (block 400) on a F-DPCH (fractional dedicated physical channel) from the first and second base stations 120a,120b. The first base station 120a may operate to provide a serving high-speed (HS) cell to the UE 110 by transmitting signals to the UE 110 on a HS-DPCCH (high-speed DPCCH). The UE 110 can control (block 402) uplink transmission power by the UE (110) of the HS-DPCCH by controlling uplink transmission power during transmission of channel quality reports through the HS-DPCCH to the first base station 120a responsive to the received TPC commands.

Figure 8:
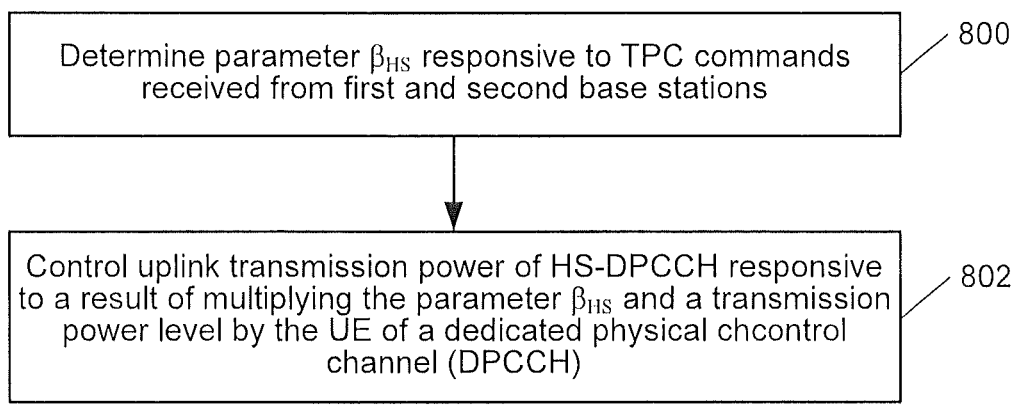

More particular operations and methods that may be performed by the UE 110 to control (block 402) uplink transmit power of the HS-DPCCH are shown in FIG. 8. The UE 110 determines (block 800) the parameter ($\beta_{HS}$) responsive to a combination of the received TPC commands. The UE 110 controls (block 802) the uplink transmission power by the UE 110 of the HS-DPCCH responsive to a result of multiplying the parameter $\beta_{HS}$ and a transmission power level by the UE 110 of a dedicated physical control channel (DPCCH).

Figure 5:
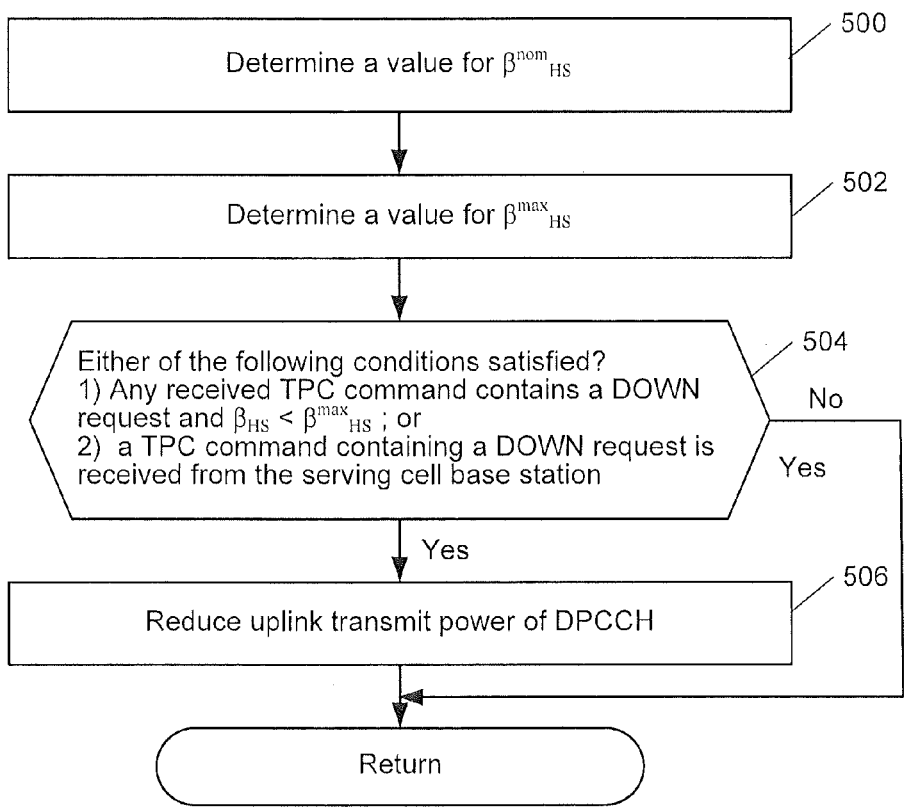

Further operations and methods that may be performed by the UE 110 to control (block 802) uplink transmit power of the HS-DPCCH are shown in FIG. 5. The UE 110 adjusts the value of parameter $\beta_{HS}$ based on the received TPC commands. To adjust parameter $\beta_{HS}$, the UE 110 further determines values for parameters $\beta_{HS}^{nom}$ and $\beta_{HS}^{max}$. The parameter $\beta_{HS}^{nom}$ is determined (block 500) as a nominal value of parameter $\beta_{HS}$, i.e. the value of parameter $\beta_{HS}$ at the start of the transmission. The parameter $\beta_{HS}^{max}$ is determined (block 502) as a maximum value of parameter $\beta_{HS}$.

The UE 110 can be further configured to determine (block 504) that either of the following two conditions is satisfied: 1) any TPC command received from either of the first and second base stations 120a,120b contains a DOWN request (for the UE 110 to decrease transmission power of the HS-DPCCH) and that parameter ($\beta_{HS}$) is less than the maximum value ($\beta_{HS}^{max}$) (i.e., $\beta_{HS} < \beta_{HS}^{max}$); or 2) the TPC command from the serving HS cell one of the base stations 120a,120b contains a DOWN request (for the UE 110 to decrease transmission power of the DPCCH). The UE 110 responds to either one of the conditions being satisfied (block 504) by reducing (block 506) the uplink transmission power by the UE 110 of the DPCCH. Accordingly, when conflicting TPC commands are received from the base stations, the UE 110 will choose to decrease the uplink transmission power when the recited condition occurs.

Figure 6:
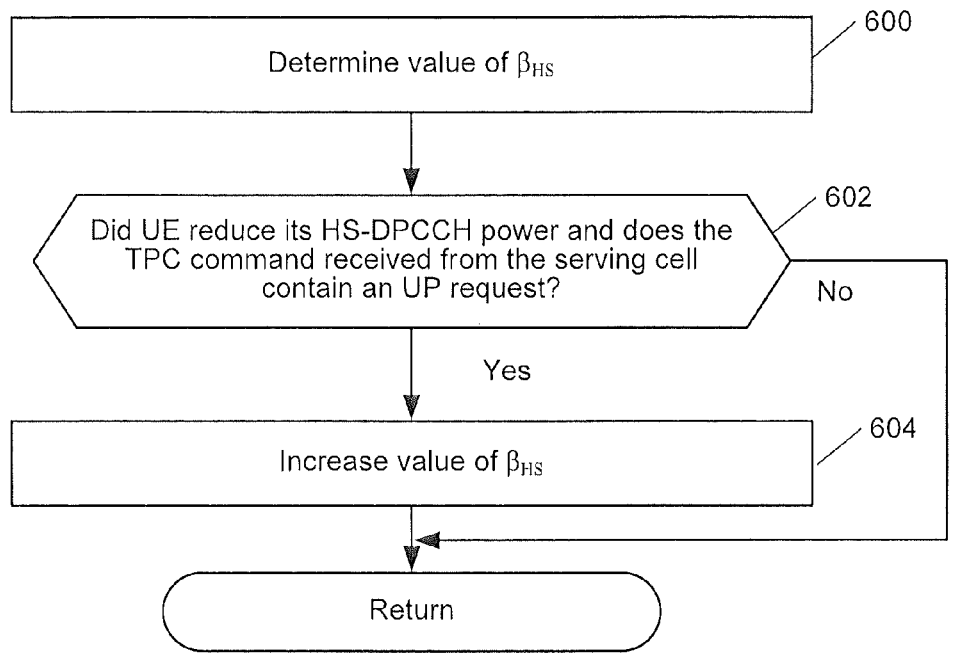

FIG. 6 is a flowchart that illustrates operations and methods by the UE 110 for controlling values of the parameter $\beta_{HS}$ in accordance with some embodiments of the present invention. An initial value of the parameter $\beta_{HS}$ is determined (block 600). The initial value of parameter $\beta_{HS}$ may be computed in a conventional manner based on quantized amplitude ratios, which are translated from $\Delta_{ACK}$, $\Delta_{NACK}$, and $\Delta_{CQI}$ signaling, such as described in 3GPP TS 25.213 V10.0.0 (2010-09), Sect. 4.3.1.2, and by translation of $\Delta_{ACK}$, $\Delta_{NACK}$, and $\Delta_{CQI}$ signaling into parameter β values as described in 3GPP TS 25.214 V10.0.0 (2010-09), Sect. 5.1.2.5A.

In accordance with further embodiments, the UE 110 determines when the following condition is satisfied: 1) the UE reduced its uplink transmission power of the DPCCH power (block 506); and 2) the TPC command from the serving HS cell one of the base stations 120a,120b contains an UP request (for the UE 110 to increase uplink transmission power of the DPCCH). The UE 110 responds by increasing (block 604) the parameter $\beta_{HS}$ value to increase (block 402) the uplink transmission power of the HS-DPCCH.

In some embodiments, the UE 110 increases the parameter $\beta_{HS}$ value in a step-wise manner using fixed step sizes, such as by increasing parameter $\beta_{HS}$ by 1 dB (or another defined step size) for each computation cycle when TPC commands are next received. Accordingly, the UE 110 may increase the parameter $\beta_{HS}$ by a fixed step size responsive to each instance of the TPC commands containing a request for the UE 110 to increase transmission power of the DPCCH.

In some other embodiments, the UE 110 increases the parameter $\beta_{HS}$ value in a step-wise manner using step sizes that are determined based on a present value of parameter $\beta_{HS}$. For example, the UE 110 may include a table that defines values of parameter $\beta_{HS}$ and corresponding step-sizes. The UE 110 may then use a present value of parameter $\beta_{HS}$ as an index to look-up a step-size that is to be added to the present value of parameter $\beta_{HS}$ to generate the increased parameter $\beta_{HS}$ value.

Control of the parameter $\beta_{HS}$ value is not limited to step-wise control, and may be controlled in another defined manner which may produce more continuous or other defined changes.

Figure 7:
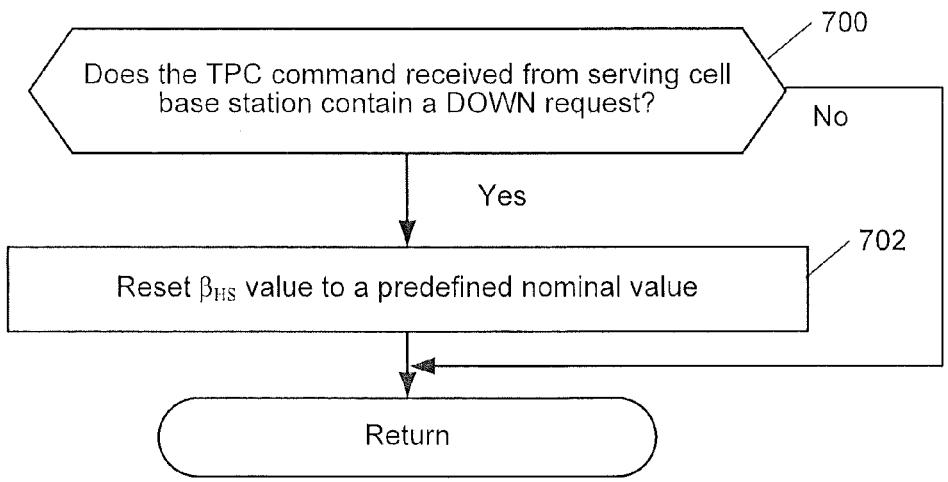

FIG. 7 is a flowchart that illustrates further operations and methods by the UE 110 for controlling values of parameter $\beta_{HS}$ in accordance with some embodiments of the present invention. The UE 110 can be further configured to determine (block 700) when the TPC command received from the serving HS cell one of the base stations 120a,120b contains a DOWN request (for the UE 110 to decrease uplink transmission power of the DPCCH). The UE 110 responds by resetting (block 702) the parameter $\beta_{HS}$ value to a predefined nominal value.

Although various operations and methods have been explained with separate reference to the flowcharts of FIGS. 4-8 for ease of illustration and explanation, it is to be understood that these operations and methods may be combined in any manner. Thus, for example, a UE may operate according to the operations of only one of FIGS. 4-8, may operate according to operations of any two or more of FIGS. 4-8, or may operate according to the operations of all of FIGS. 4-8.

Operating in this manner, the HS-DPCCH is controlled more robustly to ensure that signaling by the UE through the HS-DPCCH reaches the base station of the serving cell. Moreover, unnecessary interference between neighboring cells is avoided because the transmit power is only increased when required by the instantaneous channel conditions to the base stations involved in the soft handover.

Example User Equipment Node and Network Node Configurations

Figure 9:
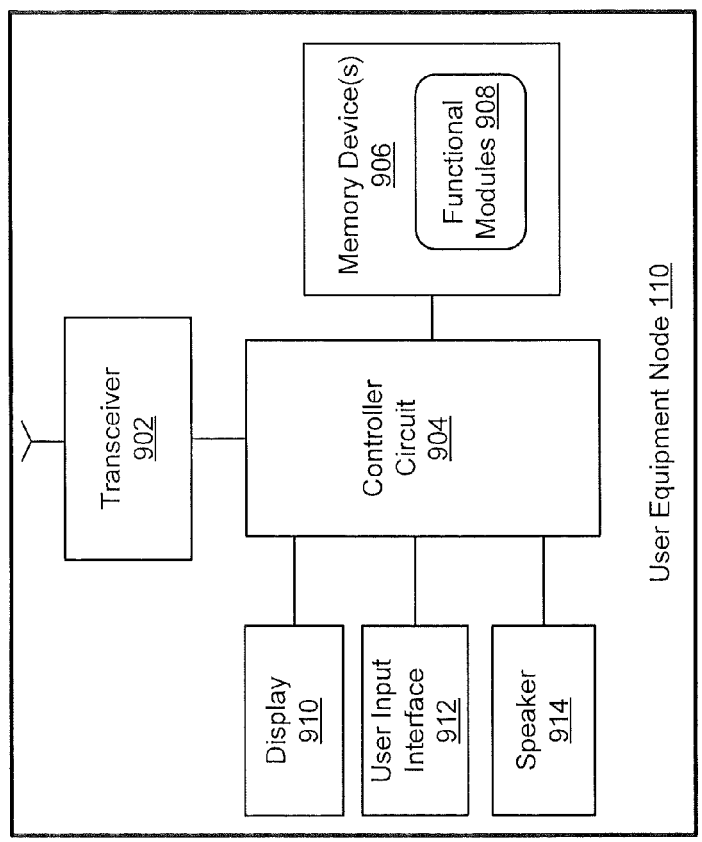
FIG. 9 is a block diagram of the UE of the communications system of FIG. 1 that is configured according to some embodiments of the present invention.

FIG. 9 is a block diagram of the UE 110 of the communications system of FIG. 1 that is configured according to some embodiments of the present invention. The UE 110 includes a transceiver 902, a controller circuit 904, and a memory device(s) 906 containing functional modules 908. The UE 110 may further include other elements, such as a display 910, a user input interface 912, and a speaker 914.

The transceiver 902 (e.g., WCDMA or other RF communication transceiver) is configured to communicate with the base stations 120a,120b of the system 100 over a wireless communication interface. The controller circuit 904 may include one or more data processing circuits, such as a general purpose and/or special purpose processor (e.g., microprocessor and/or digital signal processor). The controller circuit 904 is configured to execute computer program instructions from the functional modules 908 of the memory device(s) 906, described below as a computer readable medium, to perform at least some of the operations and methods described herein as being performed by a UE in accordance with one or more embodiments of the present invention.

Figure 10:
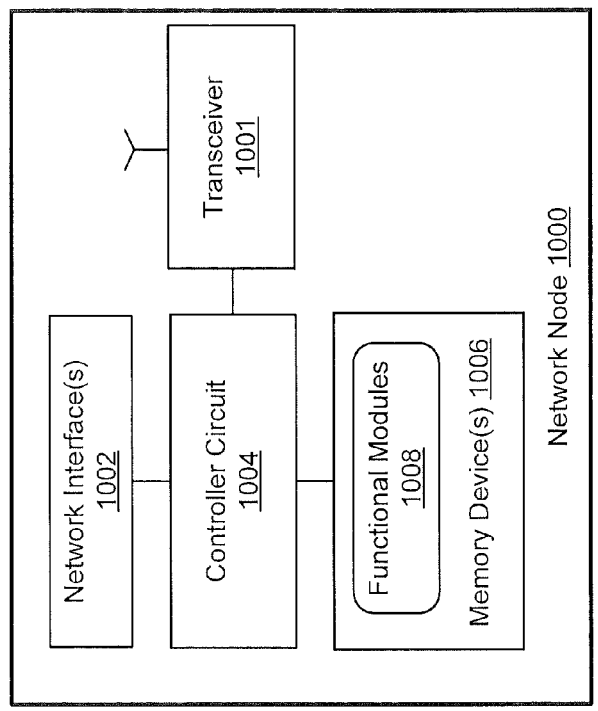
FIG. 10 is a block diagram of a network node configured according to some embodiments of the present invention, and which may be included in the base stations and/or the radio network controller of the communications system of FIG. 1.

FIG. 10 is a block diagram of a network node 1000 configured according to some embodiments of the present invention, and which may be included in the base stations 120a, 120b and/or the radio network controller 130 of the communications system of FIG. 1. The network node 1000 includes a transceiver 1001, a network interface(s) 1002, a controller circuit 1004, and a memory device(s) 1006 containing functional modules 1008.

The transceiver 1001 (e.g., WCDMA or other RF communication transceiver) is configured to communicate with the UE 110 or another node of the system 100. The controller circuit 1004 may include one or more data processing circuits, such as a general purpose and/or special purpose processor (e.g., microprocessor and/or digital signal processor). The controller circuit 1004 is configured to execute computer program instructions from the functional modules 1008 of the memory device(s) 1006, described below as a computer readable medium, to perform at least some of the operations and methods described herein as being performed by a base station and/or RNC in accordance with one or more embodiments of the present invention. The network interface 1002 communicates with the RNC 130 (when located in a base station) or communicates with the base station and the core network 140 (when located in the RNC 130).

Further Definitions and Embodiments

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network nodes, UEs, and/or methods according to embodiments of the invention will be or become apparent to one with skill in the art upon review of the present drawings and description. It is intended that all such additional network nodes, UEs, and/or methods be included within this description, be within the scope of the present invention, and be protected by the accompanying claims. Moreover, it is intended that all embodiments disclosed herein can be implemented separately or combined in any way and/or combination.

The invention claimed is:

1. A method by a user equipment node, UE, for controlling uplink transmission power during soft handover of the UE from a first base station to a second base station, the method comprising:

receiving a first transmission power control, TPC, command from the first base station and a second transmission power control, TPC, command from the second base station during the soft handover; and controlling uplink transmission power by the UE of a high-speed dedicated physical control channel (HS-DPCCH) responsive to the first and second TPC commands respectively received from the first and second base stations, wherein controlling uplink transmission power by the UE of the high speed dedicated physical control channel (HS-DPCCH) responsive to the first and second TPC commands comprises, determining a power offset parameter ($\beta_{HS}$) at the user equipment node responsive to a combination of the first and second TPC commands respectively received from the first and second base stations, and controlling the uplink transmission power ($\beta_{HS\text{-}DPCCH}$) by the UE of the high speed dedicated physical control channel (HS-DPCCH) responsive to a result of multiplying the power offset parameter ($\beta_{HS}$) and a transmission power level ($P_{DPCCH}$) by the UE of a dedicated physical control channel (DPCCH).

2. The method of claim 1, wherein controlling the uplink transmission power by the UE of the dedicated physical control channel comprises:

determining a maximum value ($\beta_{HS}^{max}$) of the power offset parameter $\beta_{HS}$;

determining when a condition occurs that at least one of the first and second TPC commands received from the first and second base stations contains a request for the UE to decrease transmission power of the dedicated physical control channel and the power offset parameter ($\beta_{HS}$) is less than the maximum value ($\beta_{HS}^{max}$); and reducing the uplink transmission power by the UE of the dedicated physical control channel responsive to the determination that the condition occurred.

3. The method of any of claim 1, wherein controlling the uplink transmission power by the UE of the dedicated physical control channel comprises:

determining when a condition occurs that the first TPC command received from the first base station contains a request for the UE to decrease transmission power of the dedicated physical control channel; and reducing the uplink transmission power by the UE of the dedicated physical control channel, responsive to the determination that the condition occurred.

4. The method of claim 1, wherein determining the power offset parameter ($\beta_{HS}$) comprises:

determining when a condition occurs that the first TPC command received from the first base station contains a request for the UE to decrease transmission power of the dedicated physical control channel; and resetting the power offset parameter ($\beta_{HS}$) to a predefined nominal value responsive to the determination that the condition occurred.

5. The method of claim 1, wherein determining the power offset parameter ($\beta_{HS}$) comprises:
   determining a predefined nominal value $\beta_{HS}^{nom}$ of the power offset parameter ($\beta_{HS}$);
   determining a maximum value ($\beta_{HS}^{max}$) of the power offset parameter ($\beta_{HS}$);
   determining occurrence of a first condition when at least one of the first and second TPC commands received from the first and second base stations contains a request for the UE to decrease transmission power of the dedicated physical control channel and the power offset parameter ($\beta_{HS}$) is less than the maximum value ($\beta_{HS}^{max}$), or when the first TPC command received from the first base station contains a request for the UE to decrease transmission power of the dedicated physical control channel;
   reducing the uplink transmission power by the UE of the dedicated physical control channel, responsive to the determination that the first condition occurred;
   determining occurrence of a second condition when the UE reduced the uplink transmission power of the dedicated physical control channel and the first TPC command received from the first base station contains a request for the UE to increase transmission power of the dedicated physical control channel;
   increasing the power offset parameter ($\beta_{HS}$) to increase the uplink transmission power by the UE of the high-speed dedicated physical control channel, responsive to the determination that the second condition occurred;
   determining occurrence of a third condition when the first TPC command received from the first base station contains a request for the UE to decrease transmission power of the dedicated physical control channel; and
   resetting the power offset parameter ($\beta_{HS}$) to the predefined nominal value $\beta_{HS}^{nom}$ responsive to the determination that the third condition occurred.

6. The method of claim 1 wherein:
   receiving comprises receiving the first and second TPC commands on a fractional dedicated physical channel from the first and second base stations.

7. The method of claim 1, further comprising:
   receiving signals by the UE on a high-speed downlink shared channel from the first base station, and
   wherein controlling uplink transmission power by the UE of the high-speed dedicated physical control channel comprises controlling uplink transmission power during transmission of channel quality reports through the high-speed dedicated physical control channel to the first base station responsive to the first and second TPC commands respectively received from the first and second base stations.

8. The method of claim 1 wherein receiving the first and second TPC commands comprises concurrently receiving the first and second TPC commands on a fractional dedicated physical control channel from the first and second base stations, the method further comprising:
   receiving signals at the UE on a high-speed downlink shared channel from the first base station,
   wherein controlling uplink transmission power by the UE of the high-speed dedicated physical control channel comprises controlling uplink transmission power during transmission of channel quality reports through the high-speed dedicated physical control channel to the first base station responsive to the result of multiplying the power offset parameter ($\beta_{HS}$) and the transmission power level ($P_{DPCCH}$) by the UE of a dedicated physical control channel (DPCCH).

9. The method of claim 1 wherein the first and second TPC commands are received concurrently.

10. The method of claim 1, wherein determining the power offset parameter ($\beta_{HS}$) comprises:
   determining when a condition occurs that the UE reduced the uplink transmission power of the dedicated physical control channel and the first TPC command received from the first base station contains a request for the UE to increase transmission power of the dedicated physical control channel; and
   increasing the power offset parameter ($\beta_{HS}$) to increase the uplink transmission power by the UE of the high-speed dedicated physical control channel, responsive to the determination that the condition occurred.

11. The method of claim 10, wherein determining the power offset parameter ($\beta_{HS}$) comprises increasing the power offset parameter ($\beta_{HS}$) by a fixed step size responsive to the first and second TPC commands containing a request for the UE to increase transmission power of the high-speed dedicated physical control channel.

12. The method of claim 10, wherein determining the power offset parameter ($\beta_{HS}$) comprises:
   accessing a table that defines values of the power offset parameter ($\beta_{HS}$) and corresponding step-sizes, by using a present value of the power offset parameter ($\beta_{HS}$) as an index to look-up one of the step-sizes; and
   adding the looked-up one of the step-sizes to the present value of the power offset parameter ($\beta_{HS}$) to generate a new value for the power offset parameter ($\beta_{HS}$) used to control the uplink transmission power by the UE of the high-speed dedicated physical control channel.

13. A user equipment node, UE, comprising:
   a transceiver that receives a first transmission power control, TPC, command from a first base station and a second transmission power control, TPC, command from a second base station during soft handover of the UE from the first base station to the second base station; and
   a controller circuit that controls uplink transmission power by the transceiver of a high-speed dedicated physical control channel (HS-DPCCH) responsive to the first and second TPC commands respectively received from the first and second base stations, wherein the controller circuit is adapted to determine a power offset parameter ($\beta_{HS}$) at the user equipment node responsive to a combination of the first and second TPC commands respectively received from the first and second base stations, and adapted to control the uplink transmission power ($\beta_{HS\text{-}DPCCH}$), by the transceiver of the high-speed dedicated physical control channel (HS-DPCCH) responsive to a result of multiplying the power offset parameter ($\beta_{HS}$) and a transmission power level ($P_{DPCCH}$) by the transceiver of a dedicated physical control channel (DPCCH).

14. The UE of claim 13, wherein:
   the transceiver is adapted to receive signals on a high-speed downlink shared channel from the first base station; and
   the controller circuit is adapted to control uplink transmission power by the transceiver of the high-speed dedicated physical control channel during transmission of channel quality reports through the high-speed dedicated physical control channel to the first base station responsive to the first and second TPC commands respectively received from the first and second base stations.

15. The UE of claim 13, wherein:
the controller circuit is adapted to determine a maximum value ($\beta_{HS}^{max}$) of the power offset parameter ($\beta_{HS}$), to determine when a condition occurs that at least one of the first and second TPC commands received from the first and second base stations contains a request for the UE to decrease transmission power of the dedicated physical control channel and the power offset parameter ($\beta_{HS}$) is less than the maximum value ($\beta_{HS}^{max}$), and adapted to reduce the uplink transmission power of the transceiver of the dedicated physical control channel responsive to the determination that the condition occurred.

16. The UE of claim 13, wherein the controller circuit is adapted to determine when a condition occurs that the first TPC command received from the first base station contains a request for the UE to decrease transmission power of the dedicated physical control channel, and adapted to reduce the uplink transmission power of the transceiver of the dedicated physical control channel, responsive to the determination that the condition occurred.

17. The UE of claim 13, wherein the controller circuit is adapted to determine the power offset parameter ($\beta_{HS}$) by:
determining when a condition occurs that the first TPC command received from the first base station contains a request for the UE to decrease transmission power of the dedicated physical control channel; and
resetting the power offset parameter ($\beta_{HS}$) to a predefined nominal value responsive to the determination that the condition occurred.

18. The UE of claim 13, wherein the controller circuit is adapted to determine the power offset parameter ($\beta_{HS}$) by:
determining a predefined nominal value $\beta_{HS}^{nom}$ of the power offset parameter ($\beta_{HS}$);
determining a maximum value ($\beta_{HS}^{max}$) of the power offset parameter ($\beta_{HS}$);
determining occurrence of a first condition when at least one of the first and second TPC commands received from the first and second base stations contains a request for the UE to decrease transmission power of the dedicated physical control channel and the power offset parameter ($\beta_{HS}$) is less than the maximum value ($\beta_{HS}^{max}$), or when the first TPC command received from the first base station contains a request for the UE to decrease transmission power of the dedicated physical control channel;
reducing the uplink transmission power by the UE of the dedicated physical control channel, responsive to the determination that the first condition occurred;
determining occurrence of a second condition when the UE reduced the uplink transmission power of the dedicated physical control channel and the first TPC command received from the first base station contains a request for the UE to increase transmission power of the dedicated physical control channel;
increasing the power offset parameter ($\beta_{HS}$) to increase the uplink transmission power by the UE (110) of the high-speed dedicated physical control channel, responsive to the determination that the second condition occurred;
determining occurrence of a third condition when the first TPC command received from the first base station contains a request for the UE to decrease transmission power of the dedicated physical control channel; and
resetting the power offset parameter ($\beta_{HS}$) to the predefined nominal value $\beta_{HS}^{nom}$ responsive to the determination that the third condition occurred.

19. The UE of claim 13, wherein:
the transceiver is adapted to receive the first and second TPC commands on a fractional dedicated physical channel from the first and second base stations.

20. The UE of claim 13,
wherein receiving the first and second TPC commands comprises concurrently receiving the first and second TPC commands on a fractional dedicated physical control channel from the first and second base stations,
wherein the transceiver receives signals at the UE on a high-speed downlink shared channel from the first base station, and
wherein the controller circuit controls uplink transmission power during transmission of channel quality reports through the high-speed dedicated physical control channel to the first base station responsive to the result of multiplying the power offset parameter ($\beta_{HS}$) and the transmission power level ($P_{DPCCH}$) by the UE of a dedicated physical control channel (DPCCH).

21. The UE of claim 13 wherein the first and second TPC commands are received concurrently.

22. The UE of claim 13, wherein the controller circuit is adapted to determine the power offset parameter ($\beta_{HS}$) by:
determining when a condition occurs that the UE reduced the uplink transmission power of the dedicated physical control channel and the first TPC command received from the first base station contains a request for the UE to increase transmission power of the dedicated physical control channel; and
increasing the power offset parameter ($\beta_{HS}$) to increase the uplink transmission power of the transceiver of the high-speed dedicated physical control channel, responsive to the determination that the condition occurred.

23. The UE of claim 22, wherein:
the controller circuit is adapted to increase the power offset parameter ($\beta_{HS}$) by a fixed step size responsive to the first and second TPC commands containing a request for the UE to increase transmission power of the high-speed dedicated physical control channel by the transceiver.

24. The UE of claim 22, wherein the controller circuit is adapted to determine the power offset parameter ($\beta_{HS}$) by:
accessing a table that defines values of the power offset parameter ($\beta_{HS}$) and corresponding step-sizes, by using a present value of the power offset parameter ($\beta_{HS}$) as an index to look-up one of the step-sizes; and
adding the looked-up one of the step-sizes to the present value of the power offset parameter ($\beta_{HS}$) to generate a new value for the power offset parameter ($\beta_{HS}$) used to control the uplink transmission power of the transceiver of the high-speed dedicated physical control channel.

* * * * *